US012154488B2

(12) United States Patent
Lee et al.

(10) Patent No.: US 12,154,488 B2
(45) Date of Patent: Nov. 26, 2024

(54) ELECTROLUMINESCENT DISPLAY DEVICE AND METHOD OF DRIVING THE SAME

(71) Applicant: LG Display Co., Ltd., Seoul (KR)

(72) Inventors: Dong Kyu Lee, Paju-si (KR); Woo Kyu Sang, Paju-si (KR); Hyoung Sik Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/231,576

(22) Filed: Aug. 8, 2023

(65) Prior Publication Data

US 2023/0386396 A1 Nov. 30, 2023

Related U.S. Application Data

(63) Continuation of application No. 17/956,476, filed on Sep. 29, 2022, now Pat. No. 11,769,447.

(30) Foreign Application Priority Data

Oct. 28, 2021 (KR) ........................ 10-2021-0145328

(51) Int. Cl.

| | |
|---|---|
| ***G09G 3/32*** | (2016.01) |
| ***G09G 3/3208*** | (2016.01) |
| ***G09G 3/3233*** | (2016.01) |
| *G09G 3/3258* | (2016.01) |

(Continued)

(52) U.S. Cl.

CPC ............. *G09G 3/32* (2013.01); *G09G 3/3208* (2013.01); *G09G 3/3233* (2013.01); *G09G 3/3258* (2013.01); *G09G 3/3266* (2013.01); *G09G 3/3275* (2013.01); *G09G 2300/08* (2013.01); *G09G 2300/0819* (2013.01); *G09G 2310/0251* (2013.01); *G09G 2310/08* (2013.01); *G09G 2330/028* (2013.01)

(58) Field of Classification Search

CPC ...... G09G 3/32; G09G 3/3208; G09G 3/3233; G09G 3/3258; G09G 3/3266; G09G 3/3275; G09G 2300/0819; G09G 2300/08; G09G 2310/0251; G09G 2310/08; G09G 2330/028

See application file for complete search history.

(56) References Cited

U.S. PATENT DOCUMENTS

| | | | | |
|---|---|---|---|---|
| 11,271,181 | B1 | 3/2022 | Yang et al. | |
| 2018/0233085 | A1 | 8/2018 | Wang | |
| 2020/0226978 | A1* | 7/2020 | Lin | G09G 3/3233 |

(Continued)

*Primary Examiner* — William Boddie
*Assistant Examiner* — Saifeldin E Elnafia
(74) *Attorney, Agent, or Firm* — Birch, Stewart, Kolasch & Birch, LLP

(57) ABSTRACT

An electroluminescent display device can include a light emitting element; and a pixel driving circuit for applying a driving current to the light emitting element, in which the pixel driving circuit includes a first transistor connected to the first, second and third nodes; a second transistor connected between the third node and the second node; a third transistor connected between the first node and a data line; a fourth transistor connected between the first node and a first driving voltage line; a fifth transistor connected between the second node and a fourth node; a seventh transistor connected between the fourth node and a reset voltage line, and a storage capacitor disposed between the first driving voltage line and the third node.

14 Claims, 7 Drawing Sheets

(51) Int. Cl.
*G09G 3/3266* (2016.01)
*G09G 3/3275* (2016.01)

(56) References Cited

U.S. PATENT DOCUMENTS

| | | | | |
|---|---|---|---|---|
| 2021/0118361 | A1* | 4/2021 | Li | G09G 3/3233 |
| 2021/0134227 | A1 | 5/2021 | Im et al. | |
| 2021/0264857 | A1* | 8/2021 | Wang | G09G 3/3258 |
| 2021/0287605 | A1* | 9/2021 | Wang | G09G 3/2092 |

* cited by examiner

[FIG. 1]
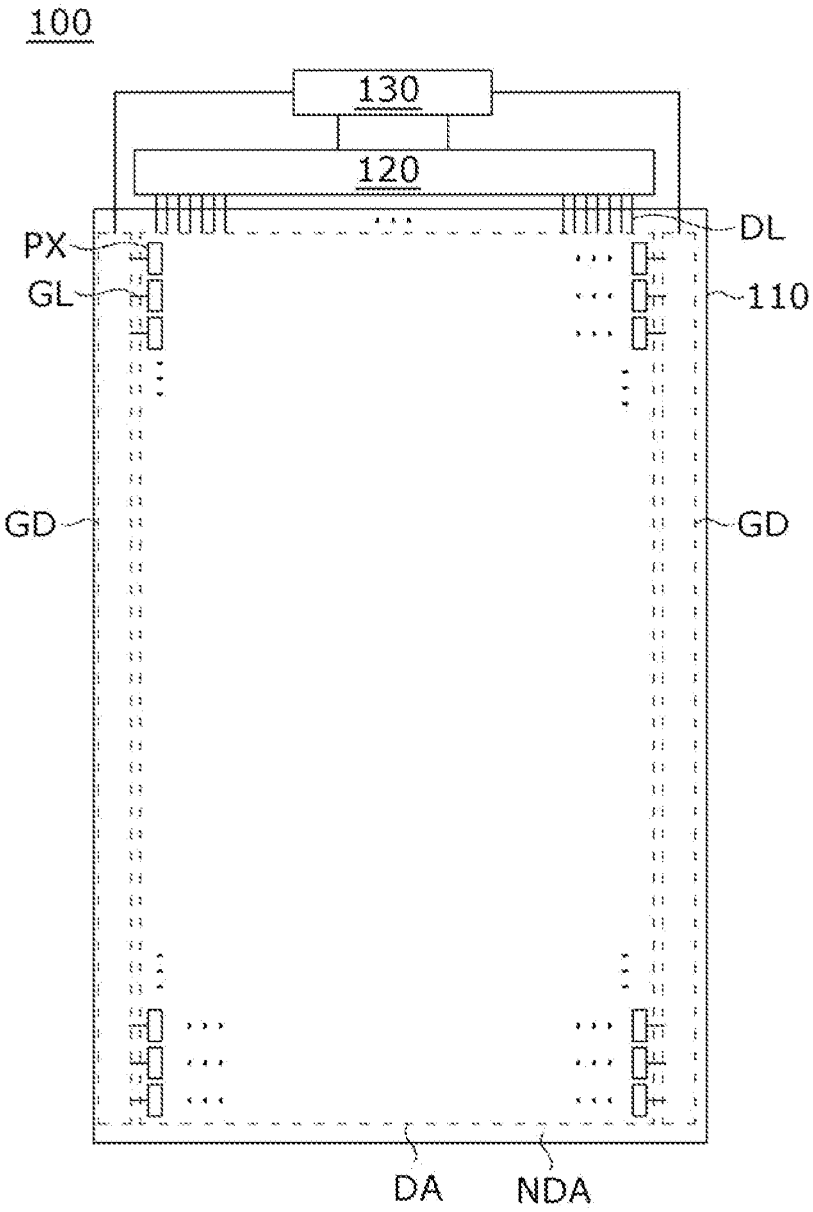

[FIG. 2]
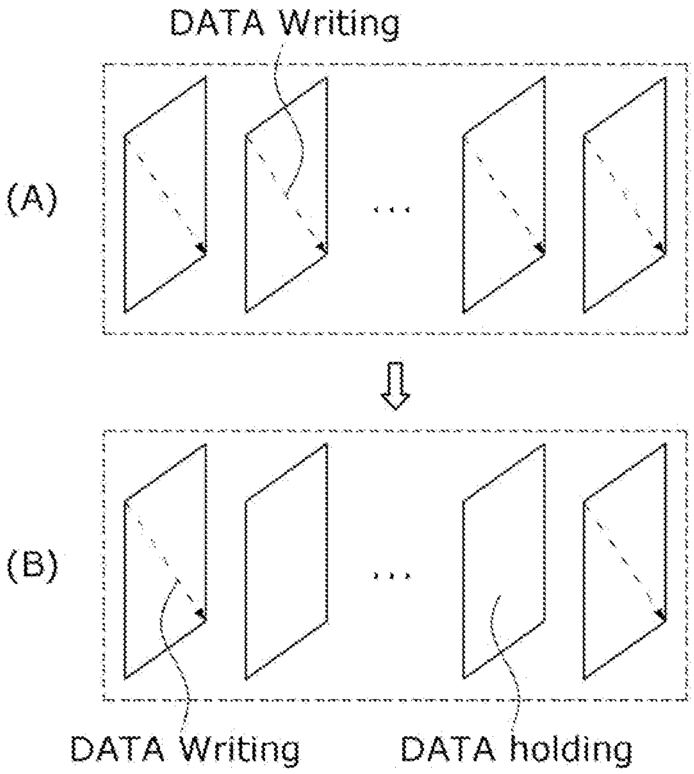

[FIG. 3]
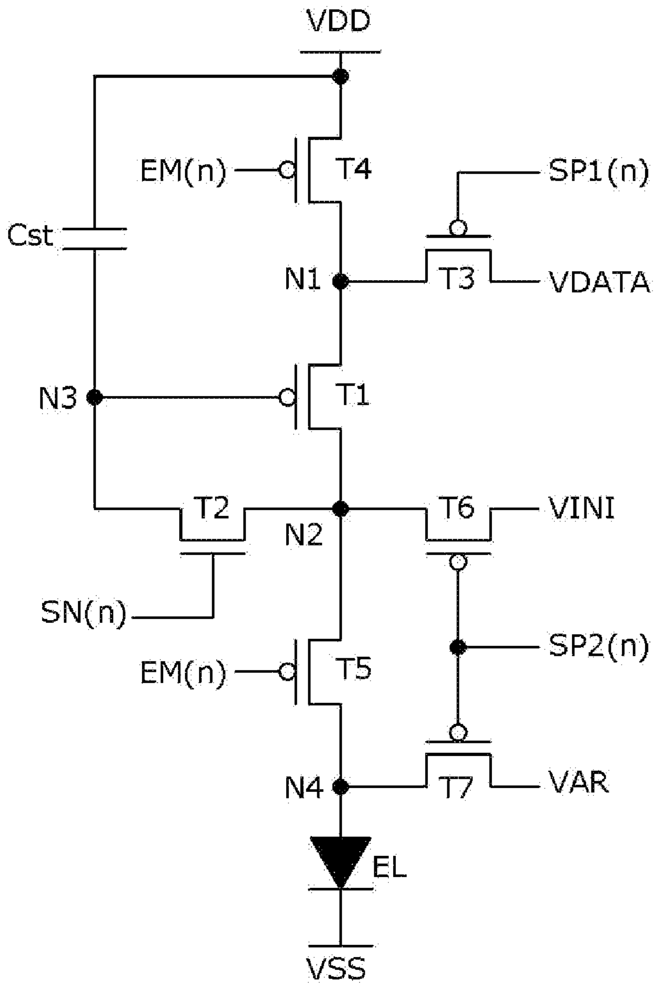

[FIG. 4]
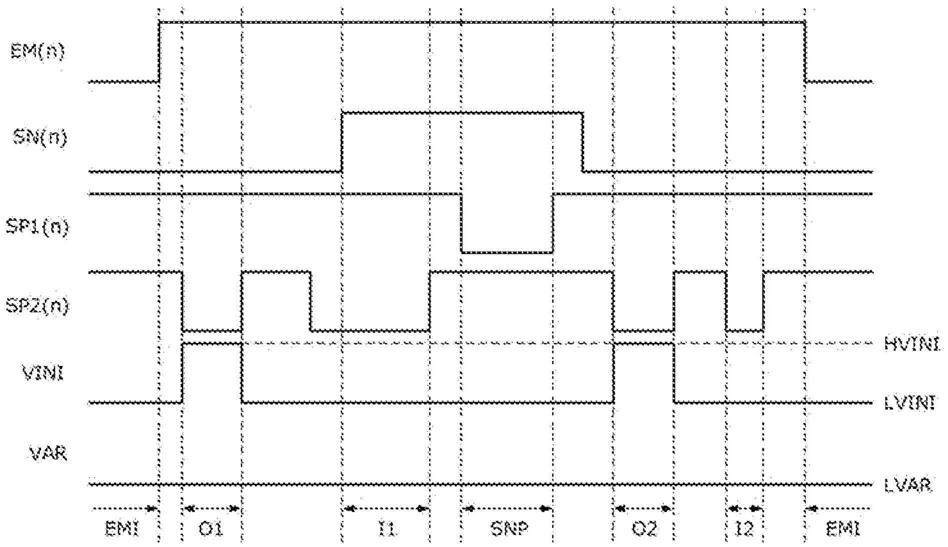
[FIG. 5]
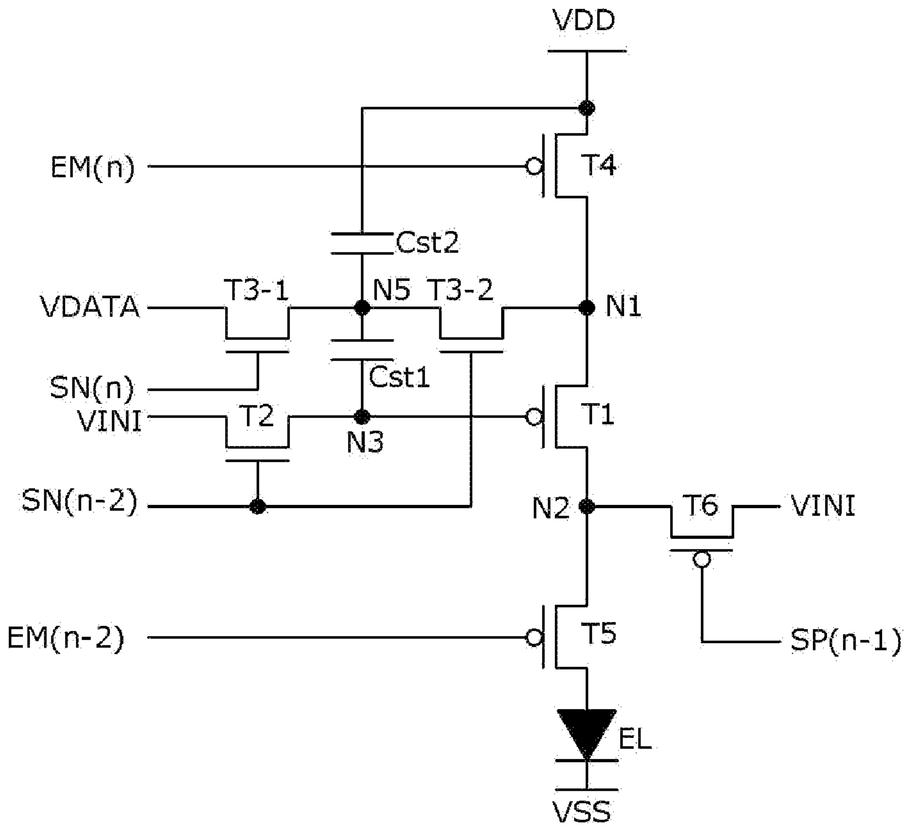

[FIG. 6]
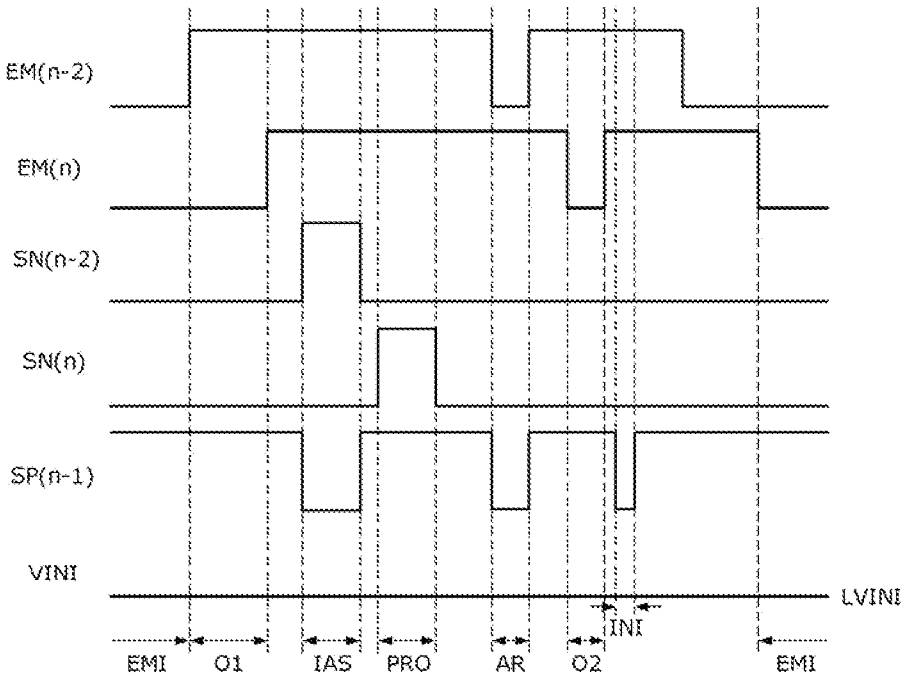

[FIG. 7]
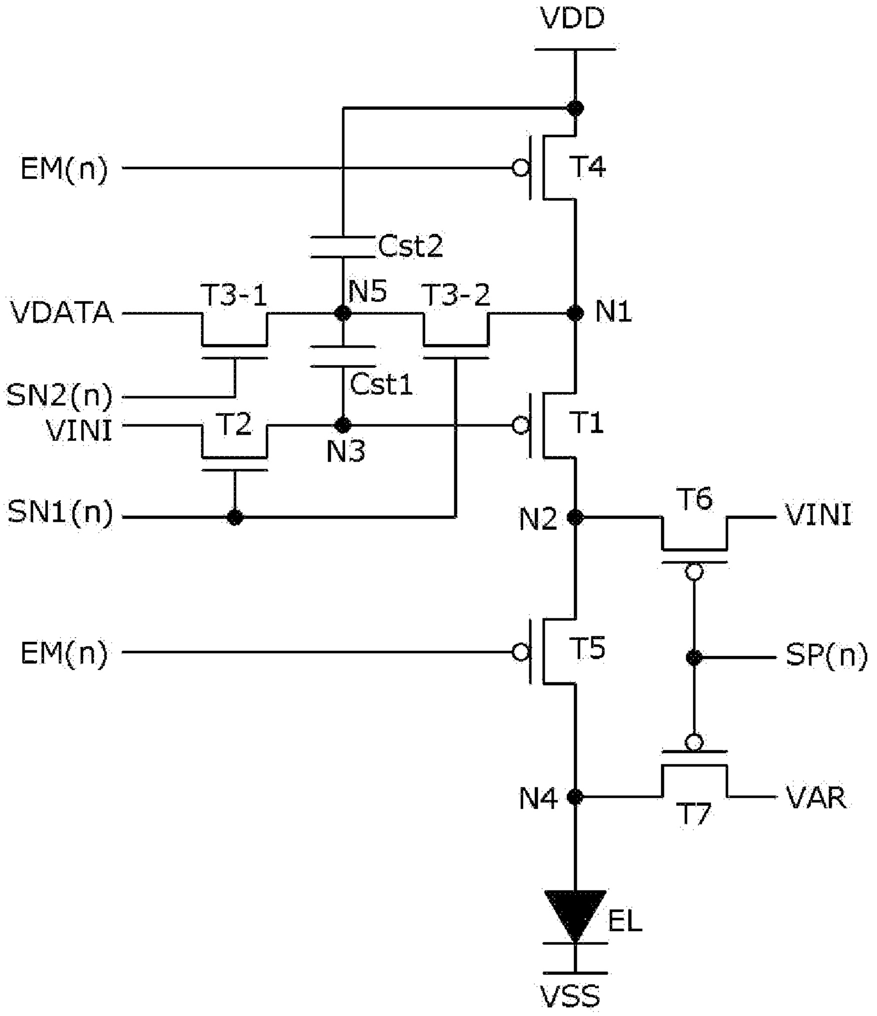

[FIG. 8]
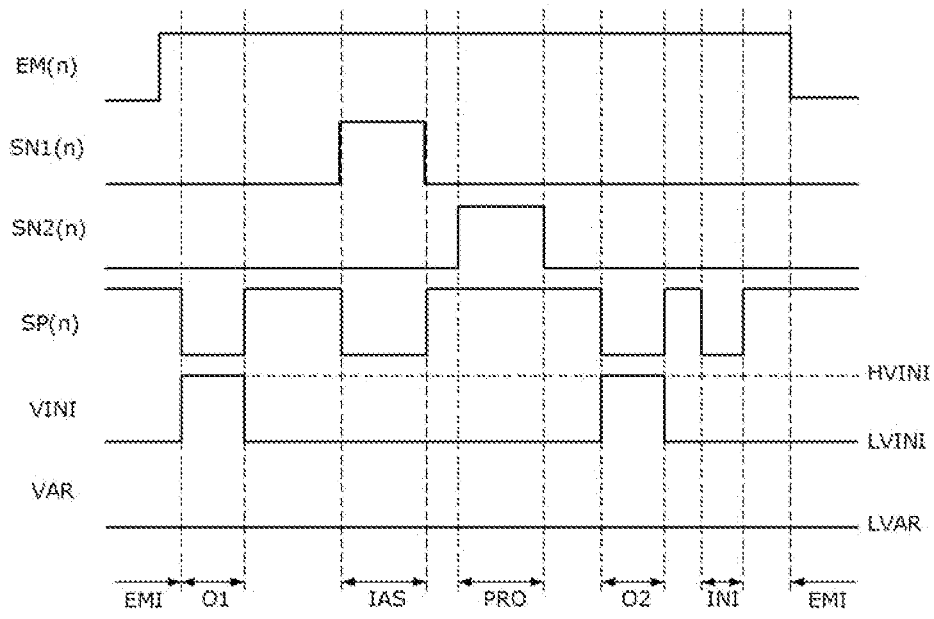

ELECTROLUMINESCENT DISPLAY DEVICE AND METHOD OF DRIVING THE SAME

CROSS-REFERENCE TO RELATED APPLICATION

This application is a Continuation Application of U.S. application Ser. No. 17/956,476, filed on Sep. 29, 2022 (now U.S. Pat. No. 11,769,447, issued on Sep. 26, 2023), which claims priority to and the benefit of Korean Patent Application No. 10-2021-0145328, filed on Oct. 28, 2021 in the Republic of Korea, the entire contents of all these applications being hereby expressly incorporated by reference into the present application.

BACKGROUND

1. Field of the Invention

The present disclosure relates to an electroluminescent display device including a pixel drive circuit capable of improving image quality, and a method of driving the same.

2. Discussion of Related Art

With the development of information technology, the market for display devices serving as connection media between users and information is growing. Accordingly, the use of various types of display devices such as electroluminescent display devices, liquid crystal display devices, organic light emitting display devices, and quantum dot display devices is increasing.

Among the above devices, the electroluminescent display device has advantages of a fast response speed, high light emission efficiency, and a large viewing angle. The electroluminescent display device includes a display panel including a plurality of sub-pixels, a pixel drive circuit for supplying a signal for driving the display panel, and a power supply for supplying power to the display panel. The pixel drive circuit includes a gate drive circuit for supplying a gate signal to the display panel and a data drive circuit for supplying a data signal to the display panel.

For example, in the electroluminescent display device, when a gate signal and a data signal are supplied to a sub-pixel, a light emitting element of a selected sub-pixel emits light so that an image can be displayed. The light emitting element can be implemented based on an organic material or an inorganic material.

The electroluminescent display device has various advantages due to displaying an image based on the light generated from the light emitting element in the sub-pixel. However, in order to improve image quality, it is desirable to improve the accuracy of the pixel drive circuit which controls light emission of the sub-pixel. For example, the accuracy of the pixel drive circuit can be improved by compensating for a threshold voltage of a driving transistor included in the pixel drive circuit.

In addition, in order to reduce power consumption, the electroluminescent display device can be driven at low speed. When the electroluminescent display device is driven at low speed, however, an image quality defect unrecognized during high speed driving can occur. Accordingly, there is a need for a method of designing and driving a pixel drive circuit, which is capable of preventing or minimizing image quality from being degraded.

SUMMARY OF THE DISCLOSURE

As described above, as the resolution of the electroluminescent display device increases and power consumption increases, a driving technology for reducing the power consumption of the electroluminescent display device is being developed. In order to reduce the power consumption, pixels can be driven at low speed by lowering a frame rate during a specific period. For example, in the case of a mobile model, power consumption can be reduced by performing normal driving at a frequency of 60 Hz or 120 Hz in an actual use mode and performing low speed driving at a frequency of 1 Hz in a standby mode.

In addition, when transistors included in the pixel drive circuit are implemented as P-type polycrystalline transistors, a leakage current can occur at a gate node of a driving transistor during driving at a low speed. Due to the occurrence of the leakage current, it can be difficult for the light emitting element to maintain the same brightness for one frame, and since a data update period is prolonged, a screen flicker can be seen.

In addition, as the driving of the electroluminescent display device continues, hysteresis in which the threshold voltage of the driving transistor is varied can occur. In order to reduce the hysteresis of the driving transistor, predetermined stress can be applied to the driving transistor. A method of applying predetermined stress to the driving transistor prevents the hysteresis of the driving transistor but can increase an anode voltage of the light-emitting element, and thus it can be difficult to express a low gradation at a low data voltage.

Accordingly, the present disclosure is to provide an electroluminescent display device, which can address these limitations associated with the related art.

The present disclosure is directed to an electroluminescent display device including a pixel drive circuit for reducing hysteresis of a driving transistor in low speed driving and a method of driving the same.

The present disclosure is also directed to an electroluminescent display device including a pixel drive circuit for accurate low gradation expression and a method of driving the same.

The problems to be solved or addressed by the present disclosure are not limited to the above-described problems, and other problems not described can be clearly understood by those skilled in the art from the following description.

According to an aspect of the present disclosure, there is provided an electroluminescent display device including a light-emitting element, a pixel drive circuit configured to apply a driving current to the light-emitting element, a power supply configured to provide a power voltage to the pixel drive circuit, a data drive circuit configured to provide a data voltage to the pixel drive circuit, and a gate drive circuit configured to provide a gate voltage to the pixel drive circuit. In addition, the pixel drive circuit can include a driving transistor of which a source electrode is connected to a first node (e.g., node N1), a drain electrode is connected to a second node (e.g., node N2), and a gate electrode is connected to a third node (e.g., node N3), an emission transistor connected between the driving transistor and the light-emitting element, and an initialization transistor connected to the second node. In addition, before the light-emitting element emits light, the initialization transistor can be turned on to apply the initialization voltage to the second node. Accordingly, during low speed driving and low gradation expression, it is possible to prevent image quality degradation of the electroluminescent display device.

According to another aspect of the present disclosure, there is provided a method of driving an electroluminescent display device including a light-emitting element and a pixel drive circuit, the method including driving the pixel drive circuit during a first initialization period, a second initialization period, an on bias stress (OBS) period, a sampling and programming period, and a light emission period. The first initialization period can be a period performed before the sampling and programming period, the second initialization period can be a period performed between the OBS period and the light emission period, and the second initialization period can be a period that is shorter than the first initialization period, the OBS period, the sampling and programming period, and the light emission period. Accordingly, during low speed driving and low gradation expression, it is possible to prevent image quality degradation of the electroluminescent display device.

The details of other embodiments are included in the detailed description and the accompanying drawings.

BRIEF DESCRIPTION OF THE DRAWINGS

The above and other objects, features and advantages of the present disclosure will become more apparent to those skilled in the art by describing exemplary embodiments thereof in detail with reference to the accompanying drawings, in which:

FIG. 1 is a block diagram illustrating an electroluminescent display device according to one embodiment of the present disclosure;

FIG. 2 is a diagram illustrating low speed driving of the electroluminescent display device of FIG. 1;

FIG. 3 is a circuit diagram illustrating a pixel drive circuit and a light-emitting element according to one embodiment of the present disclosure;

FIG. 4 is a waveform diagram illustrating gate signals and voltages which are input to the pixel drive circuit of FIG. 3;

FIG. 5 is a circuit diagram illustrating a pixel drive circuit and a light-emitting element according to another embodiment of the present disclosure;

FIG. 6 is a waveform diagram illustrating gate signals and voltages which are input to the pixel drive circuit of FIG. 5;

FIG. 7 is a circuit diagram illustrating a pixel drive circuit and a light-emitting element according to still another embodiment of the present disclosure; and FIG. 8 is a waveform diagram illustrating gate signals and voltages which are input to the pixel drive circuit of FIG. 7.

DETAILED DESCRIPTION OF THE EMBODIMENTS

Advantages, features, and methods of achieving them will become clear with reference to embodiments described in detail below in conjunction with the accompanying drawings. The present disclosure may, however, be implemented in many different forms and should not be construed as being limited to the embodiments set forth herein, and the embodiments are provided such that this disclosure will be thorough and complete and will fully convey the scope of the present disclosure to those skilled in the art to which the present disclosure pertains, and the present disclosure is defined by only the scope of the appended claims.

Shapes, sizes, ratios, angles, numbers, and the like disclosed in the drawings for describing the embodiments of the present disclosure are illustrative, and thus the present disclosure is not limited to the illustrated details. Further, in the following description of the present disclosure, when a detailed description of a known related technology is determined to unnecessarily obscure the gist of the present disclosure, the detailed description thereof will be omitted herein. When terms “including,” “having,” “consisting of,” and the like mentioned in the present disclosure are used, other parts can be added unless the term “only” is used herein. When a component is expressed in the singular, cases including the plural are included unless otherwise specified.

In analyzing a component, it is interpreted as including an error range even when there is no explicit description.

In describing a positional relationship, for example, when a positional relationship of two parts is described as being “on,” “above,” “below, “next to,” or the like, unless “immediately” or “directly” is used, one or more other parts can be located between the two parts.

In describing a temporal relationship, for example, when a temporal precedence relationship is described as being “after,” “subsequent,” “next,” “before,” or the like, unless “immediately” or “directly” is used, cases that are not continuous can be included.

Features of various embodiments of the present disclosure can be partially or entirely coupled or combined with each other and technically, there can be various types of interlocking and driving, and the embodiments can be implemented independent of each other or implemented together in a related relationship In the present disclosure, a pixel drive circuit formed on a substrate of an electroluminescent display device can be implemented using N-type or P-type transistors. For example, the transistor can be implemented as a transistor having a metal oxide semiconductor field effect transistor (MOSFET) structure. The transistor is a three-electrode device including a gate electrode, a source electrode, and a drain electrode. The source electrode and the drain electrode of the transistor are not fixed, and the source electrode and the drain electrode of the transistor can be changed according to an applied voltage.

Hereinafter, a gate-on voltage is a voltage of a gate signal for turning a transistor on, and a gate-off voltage is a voltage for turning a transistor off.

Hereinafter, an electroluminescent display device and a method of driving the same according to one embodiment of the present disclosure will be described with reference to the accompanying drawings. All the components of each electroluminescent display device according to all embodiments of the present disclosure are operatively coupled and configured.

FIG. 1 is a block diagram illustrating an electroluminescent display device 100 according to one embodiment of the present disclosure.

Referring to FIG. 1, the electroluminescent display device 100 according to one embodiment of the present disclosure can include a display panel 110 in which a plurality of data lines DL and a plurality of gate lines GL are disposed and a plurality of pixels PX connected to the plurality of data lines DL and the plurality of gate lines GL are disposed, and drive circuits for providing drive signals to the display panel 110.

Although it is illustrated that the plurality of pixels PX are disposed in a matrix form and constitute a pixel array, the present disclosure is not limited thereto, and the plurality of pixels PX can be disposed in various forms.

The drive circuits can include a data drive circuit 120 for providing data signals to the plurality of data lines DL, a gate drive circuit GD for providing gate signals to the plurality of gate lines GL, and a controller 130 for controlling the data drive circuit 120 and the gate drive circuit GD.

The display panel 110 can include a display area DA in which an image is displayed and a non-display area NDA which is an outer periphery of the display area DA. The plurality of pixels PX, the data lines DL which provide the data signals to the plurality of pixels PX, and the gate lines GL which provide the gate signals to the plurality of pixels PX can be disposed in the display area DA.

The plurality of data lines DL disposed in the display area DA can extend to the non-display area NDA and can be electrically connected to the data drive circuit 120. The data lines DL electrically connect the plurality of pixels PX disposed in a column direction to the data drive circuit 120 and can be implemented as a single line or implemented by connecting a plurality of lines through a contact hole using a link line.

The plurality of gate lines GL disposed in the display area DA can extend to the non-display area NDA and can be electrically connected to the gate drive circuit GD. The gate lines GL electrically connect the plurality of pixels PX disposed in a row direction to the gate drive circuit GD. In addition, lines, through which the gate drive circuit GD generates various gate signals or which transmit signals to the plurality of pixels PX, can be disposed in the non-display area NDA. For example, the lines can include one or more high level gate voltage lines which supply a high level gate voltage to the gate drive circuit GD, one or more low level gate voltage lines which supply a low level gate voltage to the gate drive circuit GD, a plurality of clock lines which supply a plurality of clock signals to the gate drive circuit GD, and one or more start lines which supply one or more start signals to the gate drive circuit GD.

In the display panel 110, the plurality of data lines DL and the plurality of gate lines GL are arranged together with the pixel array. As described above, the plurality of data lines DL and the plurality of gate lines GL can be disposed in rows or columns. For convenience of description, it is assumed that the plurality of data lines DL are disposed in columns and the plurality of gate lines GL are disposed in rows, but the present disclosure is not limited thereto.

The controller 130 starts scanning of the data signal according to a timing implemented in each frame, converts input image data input from the outside into image data according to a data signal format used in the data drive circuit 120 to output the converted image data, and controls the data drive circuit 120 at an appropriate time according to the scanning.

The controller 130 receives, from the outside, timing signals including a vertical synchronization signal, a horizontal synchronization signal, an input data enable signal, and a clock signal together with the input image data. The controller 130 receiving the timing signals generates and outputs control signals for controlling the data drive circuit 120 and the gate drive circuit GD.

For example, in order to control the data drive circuit 120, the controller 130 outputs various data control signals including a source start pulse, a source sampling clock, and a source output enable signal. The source start pulse controls data sampling start timings of one or more data signal generating circuits constituting the data drive circuit 120. The source sampling clock is a clock signal for controlling a sampling timing of data in each data signal generating circuit. The source output enable signal controls an output timing of the data drive circuit 120.

In addition, in order to control the gate drive circuit GD, the controller 130 outputs gate control signals including a gate start pulse, a gate shift clock, and a gate output enable signal. The gate start pulse controls operation start timings of one or more gate signal generating circuits constituting the gate drive circuit GD. The gate shift clock is a clock signal which is commonly input to the one or more gate signal generating circuits and controls a shift timing of a scan signal. The gate output enable signal specifies timing information of the one or more gate signal generating circuits.

The controller 130 can be a timing controller used in general display device technology or a controller capable of further performing other control functions in addition to a function of the timing controller.

The controller 130 can be implemented as a separate component from the data drive circuit 120 or integrated with the data drive circuit 120 to be implemented as a single integrated circuit.

The data drive circuit 120 can be implemented by including one or more data signal generating circuits. The data signal generating circuit can include a shift register, a latch circuit, a digital-to-analog converter, and an output buffer. In some cases, the data signal generating circuit can further include an analog-to-digital converter.

The data signal generating circuit can be connected to a bonding pad of the display panel 110 through a tape automated bonding (TAB) method, a chip on glass (COG) method, or a chip on panel (COP) method, can be directly disposed on the display panel 110, or can be integrated and disposed on the display panel 110. Alternatively, the plurality of data signal generating circuits can be implemented in a chip on film (COF) method in which the plurality of data signal generating circuits are mounted on a source-circuit film connected to the display panel 110.

The gate drive circuit GD sequentially supplies a gate signal to the plurality of gate lines GL, thereby driving the plurality of pixels PX connected to the plurality of gate lines GL. The gate drive circuit GD can include a shift register and a level shifter.

The gate drive circuit GD can be connected to a bonding pad of the display panel 110 through a TAB method, a COG method, or a COP method and can be implemented in a gate in panel (GIP) type to be integrated and disposed on the display panel 110. Alternatively, the plurality of gate signal generating circuits can be implemented in a COF method in which the plurality of gate signal generating circuits are mounted on a gate-circuit film connected to the display panel 110. Hereinafter, for convenience of description, an example in which the gate drive circuit GD includes the plurality of gate signal generating circuits and the plurality of gate signal generating circuits implemented in a GIP type and disposed in the non-display area NDA of the display panel 110 will be described.

Under the control of the controller 130, the gate drive circuit GD sequentially supplies a gate signal of a transistor turn-on voltage (or a gate-on voltage) or a transistor turn-off voltage (or a gate-off voltage) to the plurality of gate lines GL. When a signal is provided to a specific gate line by the gate drive circuit GD, the data drive circuit 120 converts image data received from the controller 130 into an analog data signal and supplies the analog data signal to a plurality of data lines DL.

The data drive circuit 120 can be located on one side of the display panel 110. For example, the data drive circuit 120 can be located on an upper side, a lower side, a left side, or a right side of the display panel 110. Alternatively, the data drive circuit 120 can be located on both sides of the display panel 110 according to a driving method and a panel design method. For example, the data drive circuit 120 can be located on the upper and lower sides or the left and right sides of the display panel 110.

The gate drive circuit GD can be located on one side of the display panel 110. For example, the gate drive circuit GD can be located on an upper side, a lower side, a left side, or a right side of the display panel 110. Alternatively, the gate drive circuit GD can be located on both sides of the display panel 110 according to a driving method and a panel design method. For example, the gate drive circuit GD can be located on the upper and lower sides or the left and right sides of the display panel 110.

Since the example in which the plurality of gate lines GL are disposed in a row direction and the plurality of data lines DL are disposed in a column direction in the display panel 110 is described, description will be made by assuming that the data drive circuit 120 is located on the upper side of the display panel 110 and the gate drive circuit GD is located on both the left and right sides of the display panel 110.

The plurality of gate lines GL disposed in the display panel 110 can include a plurality of scan lines and a plurality of emission lines. The plurality of scan lines and the plurality of emission lines are lines which transmit different types of gate signals to gate electrodes of different transistors.

Therefore, the gate drive circuit GD can include a plurality of scan drive circuits for outputting scan signals to the plurality of scan lines that are one type of gate line GL, and a plurality of emission drive circuits for outputting emission signals to the plurality of emission lines that are another type of gate line GL.

The electroluminescent display device 100 according to one embodiment of the present disclosure can include a power supply. The power supply converts power input to the electroluminescent display device 100 from the outside of the electroluminescent display device 100 into power suitable for driving the drive circuits included in the electroluminescent display device 100 or maintains the power input to the electroluminescent display device 100. The power supply is a semiconductor integrated device implemented separately from the gate drive circuit GD, the data drive circuit 120, and the timing controller 130 and can be implemented as a single integrated circuit. In addition, when the electroluminescent display device 100 is turned on, the power supply increases an input voltage and outputs a voltage required for the timing controller 130 or the display panel 110.

FIG. 2 is a diagram illustrating low speed driving of the electroluminescent display device of FIG. 1.

Referring to FIG. 2, the electroluminescent display device 100 according to one embodiment of the present disclosure can employ low speed driving so as to reduce power consumption.

Particularly, (A) of FIG. 2 shows a case in which a frame frequency is 60 Hz, and (B) of FIG. 2 shows a case in which the frame frequency is less than 60 Hz which means low speed driving, and thus the number of image frames in which a data voltage is written is smaller than that of the driving shown in (A) of FIG. 2. In the 60 Hz driving, 60 image frames per second are reproduced, and a write operation of the data voltage is performed in all the 60 image frames. On the other hand, in the low speed driving shown in FIG. 2 (B), the writing operation of the data voltage is performed only in some of the 60 image frames, and the data voltage written in a previous image frame is maintained in the remaining image frames. In other words, since output operations of the data drive circuit 120 and the gate drive circuit GD are interrupted in the remaining image frames to which the data voltage is not written, there is an effect in that power consumption is reduced. The low speed driving can be employed for a still image or a moving image with little image change, and an update cycle of the data voltage is longer than an update cycle in the 60 Hz driving.

Therefore, in the pixel drive circuit, the time in which a voltage between the gate electrode and the source electrode of the driving transistor is maintained is longer in the low speed driving compared to the case of the 60 Hz driving. In the low speed driving, it is necessary to maintain the voltage between the gate electrode and the source electrode of the driving transistor for a desired time. To this end, switching transistors directly/indirectly connected to the gate electrode of the driving transistor can be implemented as oxide transistors having good off-characteristics. Meanwhile, in embodiments of the present disclosure, the 60 Hz driving and the low speed driving can be selectively employed according to the characteristics of the input image.

FIG. 3 is a circuit diagram illustrating a pixel drive circuit and a light-emitting element EL according to one embodiment of the present disclosure, and FIG. 4 is a waveform diagram illustrating gate signals and voltages which are input to the pixel drive circuit of FIG. 3.

As described above, each of the plurality of pixels PX includes a light-emitting element EL and a pixel drive circuit for controlling an amount of current applied to the light-emitting element EL. In addition, the amount of current applied to the light-emitting element EL can be referred to as a driving current.

The pixel drive circuit according to one embodiment of the present disclosure can be applied to pixels disposed in an $n^{th}$ row in the display area DA of the display panel 110. An anode of the light-emitting element EL can be connected to a node N4, and the pixel drive circuit can be electrically connected to the light-emitting element EL at the node N4. For example, the pixel drive circuit provides a driving current to the node N4.

Referring to FIGS. 3 and 4, in the pixel drive circuit according to one embodiment of the present disclosure, gate signals including a first scan signal SN(n), a second scan signal SP1(n), a third scan signal SP2(n), and an emission signal EM(n) are provided through the gate drive circuit GD. In addition, a data voltage VDATA is provided through the data drive circuit 120, and power voltages including a high potential voltage VDD, a low potential voltage VSS, an initialization voltage VINI, and a reset voltage VAR are provided from the power supply. In this case, the second scan signal SP1(n) and the third scan signal SP2(n) are signals for controlling a P-type transistor, and the first scan signal SN(n) is a signal for controlling an N-type transistor.

The pixel drive circuit includes a first transistor T1, a second transistor T2, a third transistor T3, a fourth transistor T4, a fifth transistor T5, a sixth transistor T6, a seventh transistor T7, and a capacitor Cst. In this case, the first transistor T1 is a driving transistor. An example in which all of the first transistor T1, the third transistor T3, the fourth transistor T4, the fifth transistor T5, the sixth transistor T6, and the seventh transistor T7 included in the pixel drive circuit according to one embodiment of the present disclosure are P-type transistors and the second transistor T2 is an N-type transistor will be described. The N-type transistor can be implemented as an oxide transistor.

The pixel drive circuit according to one embodiment of the present disclosure can be separately operated during a first OBS(On Bias Stress) period O1, a first initialization period I1, a sampling and programming period SNP, a second OBS period O2, a second initialization period I2, and a light emission period EMI.

The first scan signal SN(n) includes a pulse for turning the second transistor T2 on during the first initialization period I1 and the sampling and programming period SNP. The pulse of the first scan signal SN(n) can overlap some pulses of the second scan signal SP1(n) and the third scan signal SP2(n).

The second scan signal SP1(n) includes a pulse for turning the third transistor T3 on during the sampling and programming period SNP. The pulse of the second scan signal SP1(n) is implemented as a gate low voltage.

The third scan signal SP2(n) includes a pulse for turning the sixth transistor T6 and the seventh transistor T7 on during the first OBS period O1, the second OBS period O2, the first initialization period I1, and the second initialization period I2. The third scan signal SP2(n) is a signal for initializing the OBS of the first transistor T1 and the nodes N2 and N4. In this case, the OBS is an abbreviation of on bias stress and refers to an operation of applying stress to the first transistor T1 so as to prevent a variation in threshold voltage of the first transistor T1. A hysteresis phenomenon in which the threshold voltage of the driving transistor is varied over time can occur as a screen defect during the low speed driving. Accordingly, the OBS period can reduce the hysteresis of the first transistor T1 and improve a frame response.

During the first OBS period O1, the first initialization period I1, the sampling and programming period SNP, the second OBS period O2, and the second initialization period I2, excluding the light emission period EMI, the emission signal EM(n) includes a pulse for turning the fifth transistor T5 off. The pulse of the emission signal EM(n) can overlap pulses of the first scan signal SN(n), the second scan signal SP1(n), and the third scan signal SP2(n).

Hereinafter, elements constituting the pixel drive circuit, signals input to the elements, and driving of the pixel drive circuit during each driving period will be described.

The driving of the pixel drive circuit according to one embodiment of the present disclosure can be separately performed during the first OBS period O1, the first initialization period I1, the sampling and programming period SNP, the second OBS period O2, the second initialization period I2, and the light emission period EMI.

The driving transistor T1 is an element which provides a driving current to the light-emitting element EL, a gate electrode of the driving transistor T1 is connected to a node N3 (e.g., third node), a source electrode thereof is connected to a node N1 (e.g., first node), and a drain electrode thereof is connected to a node N2 (e.g., second node).

When the fifth transistor T5 is turned off by the emission signal EM(n), the light emission period EMI is terminated, and then the first OBS period O1 in which the sixth transistor T6 and the seventh transistor T7 are turned on by the third scan signal SP2(n) follows.

A gate electrode of the sixth transistor T6 is connected to a line through which the third scan signal SP2(n) is provided, a source electrode thereof is connected to a line through which the initialization voltage VINI is provided, and a drain electrode thereof is connected to the node N2. The sixth transistor T6 can be referred to as an initialization transistor.

A gate electrode of the seventh transistor T7 is connected to the line through which the third scan signal SP2(n) is provided, a source electrode thereof is connected to a line through which the reset voltage VAR is provided, and a drain electrode thereof is connected to the node N4.

During the first OBS period O1, the sixth transistor T6 is turned on to apply the initialization voltage VINI to the node N2, and thus the driving transistor T1 is turned on so that predetermined stress is applied. During the first OBS period O1, in order to maintain a strong saturation state after the driving transistor T1 is turned on, a high voltage level HVINI of the initialization voltage VINI is higher than or equal to a level of the high potential voltage VDD. The initialization voltage during the OBS periods O1 and O2 can be referred to as an OBS voltage.

During the first OBS period O1, the seventh transistor T7 is turned on to apply the reset voltage VAR to the node N4, thereby resetting the anode of the light-emitting element EL. During the first OBS period O1, a voltage level LVAR of the reset voltage VAR is a level of voltage that is lower than or equal to a level of the low potential voltage VSS applied to the cathode of the light-emitting element EL and can be set to a voltage that is sufficiently lower than the operating voltage of the light-emitting element EL. The reset voltage VAR is a voltage not varying and maintains a constant voltage level LVAR when the pixel drive circuit is driven.

After the first OBS period O1, the sixth transistor T6 and the seventh transistor T7 are turned on by the third scan signal SP2(n), and then the first initialization period I1 in which the second transistor T2 is turned on by the first scan signal Sn(n) follows. The sixth transistor T6 and the seventh transistor T7 are turned off between the first initialization period I1 and the first OBS period O1.

The gate electrode of the second transistor T2 is connected to a line through which the first scan signal SN(n) is provided, and the source electrode and the drain electrode of the second transistor T2 are connected to the node N3 and the node N2, respectively.

During the first initialization period I1, the second transistor T2 and the sixth transistor T6 are turned on, and the initialization voltage VINI is applied to the node N3 through the sixth transistor T6 and the second transistor T2. For example, during the first initialization period I1, the gate electrode and the drain electrode of the driving transistor T1 are discharged to the initialization voltage VINI. In this case, a low voltage level LVINI of the initialization voltage VINI is a level that is lower than the high voltage level HVINI and is a level of a sufficiently low negative voltage capable of turning the driving transistor T1 on and initializing the gate electrode and the drain electrode of the driving transistor T1.

After the first initialization period I1, the sampling and programming period SNP in which the third transistor T3 is turned on by the second scan signal SP1(n) and the second transistor T2 is turned on by the first scan signal SN(n) follows.

A gate electrode of the third transistor T3 is connected to a line through which the second scan signal SP1(n) is provided, a source electrode thereof is connected to a line through which the data voltage VDATA is provided, and a drain electrode thereof is connected to the node N1.

Even during the sampling and programming period SNP following the first initialization period I1, the second transistor T2 maintains a turn-on state, and thus the gate electrode and the drain electrode of the driving transistor T1 are electrically connected to be in a diode connection state. Then, during the sampling and programming period SNP, the third transistor T3 is turned on, and thus the data voltage VDATA is applied to the source electrode of the driving transistor T1.

During the sampling and programming period SNP, a current flows between the source electrode and the drain electrode of the driving transistor T1. Since the gate electrode and the drain electrode of the driving transistor T1 are in the diode connection state, due to the current flowing from the source electrode to the drain electrode, a voltage at the node N3 increases until a voltage Vgs between the gate electrode and the source electrode of the driving transistor T1 becomes the threshold voltage Vth of the driving transistor T1.

During the sampling and programming period SNP, the voltage of the node N3 is charged to a voltage VDATA−|Vth| corresponding to a difference between the data voltage VDATA and the threshold voltage Vth of the driving transistor T1.

The capacitor Cst includes a first electrode connected to a line through which the high potential voltage VDD is provided and a second electrode connected to the node N3. For example, the voltage VDATA−|Vth| applied to the node N3 is stored in the capacitor Cst until the light emission period EMI so that the driving transistor T1 can provide a constant driving current.

After the sampling and programming period SNP, the second OBS period O2 in which the sixth transistor T6 and the seventh transistor T7 are turned on by the third scan signal SP2(n) follows.

Similar to the first OBS period O1, during the second OBS period O2, the initialization voltage VINI is applied to the node N2 through the turned-on sixth transistor T6 to turn the driving transistor T1 on, thereby applying predetermined stress to the driving transistor T1. During the second OBS period O2, in order to maintain a strong saturation state after the driving transistor T1 is turned on, a high voltage level HVINI of the initialization voltage VINI is higher than or equal to a level of the high potential voltage VDD. For example, the initialization voltage VINI provided through the turned-on sixth transistor T6 increases a voltage of the source electrode of the driving transistor T1 to the OBS voltage. In this case, a value of the Vgs becomes VDATA−|Vth|−HVINI, and during the light emission period EMI, the Vgs becomes a state of being greater than the Vgs of the driving transistor T1.

The reset voltage VAR is applied to the node N4 again through the seventh transistor T7 which is turned-on during the second OBS period O2, thereby resetting the anode of the light-emitting element EL. During the second OBS period O2, the voltage level LVAR of the reset voltage VAR is a level of voltage that is lower than or equal to the level of the low potential voltage VSS applied to the cathode of the light-emitting element EL and can be set to a voltage that is sufficiently lower than the operating voltage of the light-emitting element EL.

After the second OBS period O2, the second initialization period I2 in which the sixth transistor T6 and the seventh transistor T7 are turned on by the third scan signal SP2(n) follows. The second initialization period I2 is a short period performed between the second OBS period O2 and the light emission period EMI. The second initialization period I2 is a period that is shorter than other driving periods such as the first initialization period I1, the first OBS period O1, the sampling and programming period SNP, and the second OBS period O2. When the second initialization period I2 is long, an effect of reducing the hysteresis phenomenon of the driving transistor through the OBS period is offset. In particular, the second initialization period I2 is a period that is shorter than the second OBS period O2. For example, the second initialization period I2 can be set to about half the second OBS period O2, but the present disclosure is not limited thereto.

The initialization voltage VINI is provided to the node N2 through the sixth transistor T6 which is turned on during the second initialization period I2. In this case, the low voltage level LVINI of the initialization voltage VINI is a level of negative voltage, which is lower than the high voltage level HVINI of the initialization voltage VINI during the first OBS period O1 or the second OBS period O2. Eventually, during the second initialization period I2, the voltage of the node N2, which rises during the second OBS period O2 before the light emission period EMI, is lowered to reduce a voltage difference between the node N2 and the node N4. When the voltage of the node N2 turns the fifth transistor T5 on and the node N2 and the node N4 are electrically connected due to the light emission period EMI in a state of the high voltage level HVINI during the second OBS period O2, a voltage level of the node N4 rises due to a high voltage level of the node N2. This causes difficulty in expressing a low gradation requiring a relatively weak driving current.

Therefore, the pixel drive circuit according to one embodiment of the present disclosure initializes the node N2 between the second OBS period O2 and the light emission period EMI to reduce the voltage difference between the node N2 and the node N4, thereby allowing the electroluminescent display device to accurately express a low gradation.

As briefly described above, the second initialization period I2 is followed by the light emission period EMI. During the light emission period EMI, the fourth transistor T4 and the fifth transistor T5 are turned on by the emission signal EM(n). Here, n can be a positive integer.

A gate electrode of the fourth transistor T4 is connected to a line through which the emission signal EM(n) is provided, a source electrode thereof is connected to a line through which the high potential voltage VDD is provided, and a drain electrode thereof is connected to the node N1.

A gate electrode of the fifth transistor T5 is connected to a line through which the emission signal EM(n) is provided, a source electrode thereof is connected to the node N2, and a drain electrode thereof is connected to the node N4. The fifth transistor T5 can be referred to as an emission transistor.

During the light emission period EMI, the high potential voltage VDD is provided to the source electrode of the driving transistor T1 through the fourth transistor T4, and the node N2 and the node N4 are electrically connected through the fifth transistor T5. Then, the driving transistor T1 is turned on by the voltage stored in the gate node to provide a driving current to the light-emitting element EL. In this case, the driving current has a value proportional to $(VDD\text{-}VDATA)^2$.

FIG. 5 is a circuit diagram illustrating a pixel drive circuit and a light-emitting element EL according to another embodiment of the present disclosure, and FIG. 6 is a waveform diagram illustrating gate signals and voltages which are input to the pixel drive circuit of FIG. 5.

The pixel drive circuit according to another embodiment of the present disclosure can be applied to pixels disposed in an $n^{th}$ row in a display area DA of a display panel 110. An anode of the light-emitting element EL can be electrically connected to the pixel drive circuit. For example, the pixel drive circuit provides a driving current to the anode of the light-emitting element EL.

Referring to FIGS. 5 and 6, in the pixel drive circuit according to another embodiment of the present disclosure, gate signals including a first scan signal SN(n-2), a second scan signal SN(n), a third scan signal SP(n-1), a first emission signal EM(n-2), and a second emission signal EM(n) are provided through a gate drive circuit GD. In addition, a data voltage VDATA is provided through the data drive circuit 120, and power voltages including a high potential voltage VDD, a low potential voltage VSS, and an initialization voltage VINI are provided from a power supply. In this case, the first scan signal SN(n-2) and the second scan signal SN(n) are signals for controlling an N-type transistor, and the third scan signal SP(n-1) is a signal for controlling a P-type transistor. The first scan signal SN(n-2) refers to a scan signal provided to pixels disposed in an $(n-2)^{th}$ row, and the third scan signal SP(n-1) refers to a scan signal provided to pixels disposed in an $(n-1)^{th}$ row.

The pixel drive circuit includes a first transistor T1, a second transistor T2, a first-third transistor T3-1, a second-third transistor T3-2, a fourth transistor T4, a fifth transistor T5, a sixth transistor T6, a first capacitor Cst1, and a second capacitor Cst2. In this case, the first transistor T1 is a driving transistor. An example in which all of the first transistor T1, the fourth transistor T4, the fifth transistor T5, and the sixth transistor T6 included in the pixel drive circuit according to another embodiment of the present disclosure are P-type transistors and the second transistor T2, the first-third transistor T3-1, and the second-third transistor T3-2 are N-type transistors will be described. The N-type transistor can be implemented as an oxide transistor.

The pixel drive circuit according to another embodiment of the present disclosure can be separately operated during a first OBS period O1, an initialization and sampling period IAS, a programming period PRO, an anode reset period AR, a second OBS period O2, an initialization period INI, and a light emission period EMI.

The first scan signal SN(n-2) includes a pulse for turning the second transistor T2 and the second-third transistor T3-2 on during the initialization and sampling period IAS. The pulse of the first scan signal SN(n-2) is implemented as a gate high voltage.

The second scan signal SN(n) includes a pulse for turning the first-third transistor T3-1 on during the programming period PRO. The pulse of the second scan signal SN(n) is implemented as a gate high voltage.

The third scan signal SP(n-1) includes a pulse for turning the sixth transistor T6 on during the initialization and sampling period IAS, the anode reset period AR, and the initialization period INI. The pulse of the third scan signal SP(n-1) is implemented as a gate low voltage.

The third scan signal SP(n-1) is a signal for initialization of the OBS of the first transistor T1, the node N2, and the anode of the first transistor T1. In this case, the description of the OBS is the same as the description described in the previous embodiment, and thus the description thereof will be omitted herein.

During the first OBS period O1, the initialization and sampling period IAS, the programming period PRO, the second OBS period O2, and the initialization period INI, excluding the anode reset period AR and the light emission period EMI, the first emission signal EM(n-2) includes a pulse for turning the fifth transistor T5 off. The first emission signal EM(n-2) refers to an emission signal provided to the pixels disposed in the $(n-2)^{th}$ row. The pulse of the first emission signal EM(n-2) overlaps pulses of the first scan signal SN(n-2) and the second scan signal SN(n) and partially overlaps a pulse of the third scan signal SP(n-1).

During the initialization and sampling period IAS, the programming period PRO, the anode reset period AR, and the initialization period INI, excluding the first OBS period O1, the second OBS period O2, and the light emission period EMI, the second emission signal EM(n) includes a pulse for turning the fourth transistor T4 off.

Hereinafter, elements constituting the pixel drive circuit, signals input to the elements, and driving of the pixel drive circuit during each driving period will be described.

The driving of the pixel drive circuit according to another embodiment of the present disclosure is separately performed during the first OBS period O1, the initialization and sampling period IAS, the programming period PRO, the anode reset period AR, the second OBS period O2, the initialization period INI, and the light emission period EMI.

The driving transistor T1 is an element which provides a driving current to the light-emitting element EL, a gate electrode of the driving transistor T1 is connected to the node N3, a source electrode thereof is connected to the node N1, and a drain electrode thereof is connected to the node N2.

When the fifth transistor T5 is turned off by the first emission signal EM(n-2), the light emission period EMI is terminated, the first OBS period O1 in which the fourth transistor T4 is turned on by the second emission signal EM(n) follows.

A gate electrode of the fourth transistor T4 is connected to a line through which the second emission signal EM(n) is provided, a source electrode thereof is connected to a line through which the high potential voltage VDD is provided, and a drain electrode thereof is connected to the node N1.

During the first OBS period O1, the fourth transistor T4 maintains a turned-on state and applies the high potential voltage VDD to the node N1, and thus the driving transistor T1 is turned on so that predetermined stress is applied.

After the first OBS period O1, the initialization and sampling period IAS in which the second transistor T2 and the second-third transistor T3-2 are turned on by the first scan signal SN(n-2) and the sixth transistor T6 is turned on by the third scan signal SP(n-1) follows. The fourth transistor T4 is turned off between the first OBS period O1 and the initialization and sampling period IAS.

The gate electrode of the second transistor T2 is connected to a line through which the first scan signal SN(n-2) is provided, and the source electrode and the drain electrode thereof are connected to the node N3 and a line through which the initialization voltage VINI is provided, respectively.

A gate electrode of the second-third transistor T3-2 is connected to the line through which the first scan signal SN(n-2) is provided, and a source electrode and a drain electrode thereof are connected to the node N1 and a node N5 (e.g., fifth node), respectively.

The first capacitor Cst1 includes a first electrode connected to the node N3 and a second electrode connected to the node N5.

A gate electrode of the sixth transistor T6 is connected to a line through which the third scan signal SP(n-1) is provided, and a source electrode and a drain electrode thereof are connected to the node N2 and a line through which the initialization voltage VINI is provided, respectively. The sixth transistor T6 can be referred to as an initialization transistor.

During the initialization and sampling period IAS, the second transistor T2 and the sixth transistor T6 are turned on, and the initialization voltage VINI is applied to each of the node N3 and the node N2 through the second transistor T2 and the sixth transistor T6. For example, during the initialization and sampling period IAS, the gate electrode and the drain electrode of the driving transistor T1 are discharged to the initialization voltage VINI. In this case, the initialization voltage VINI is constant as the low voltage level LVINI, and the low voltage level LVINI is lower than or equal to the low potential voltage VSS. In addition, since voltages of the gate electrode and the drain electrode of the driving transistor T1 are equal to the initialization voltage VINI, the driving transistor T1 becomes a diode connection state, and a voltage of the source node of the driving transistor T1 becomes the threshold voltage Vth of the driving transistor T1. For example, a voltage of the node N1, which is the source node of the driving transistor T1, becomes a voltage VINI-Vth.

The second-third transistor T3-2 is turned on to electrically connect the node N5 and the node N1 so that a voltage of the node N5 becomes the same as the voltage of the node N1.

After the initialization and sampling period IAS, the programming period PRO in which the first-third transistor T3-1 is turned on by the second scan signal SN(n) follows.

The gate electrode of the first-third transistor T3-1 is connected to a line through which the second scan signal SN(n) is provided, and the source electrode and the drain electrode thereof are connected to the node N5 and a line through which the data voltage VDATA is provided, respectively.

The second capacitor Cst2 includes a first electrode connected to the node N5 and a second electrode connected to a line through which the high potential voltage VDD is applied.

During the programming period PRO, the data voltage VDATA is provided to the node N5 through the first-third transistor T3-1. Since a voltage variation at the node N5 also affects the node N3 due to a coupling phenomenon of the first capacitor Cst1, a voltage of the node N3 becomes a voltage VDATA+Vth. For example, during the programming period PRO, the node N3 is charged to a voltage corresponding to the sum of the data voltage VDATA and the threshold voltage Vth of the driving transistor T1. In addition, since the high potential voltage VDD is continuously provided to the second electrode of the second capacitor Cst2, the data voltage VDATA provided to the first electrode of the second capacitor Cst2 during the programming period PRO can be maintained until the light emission period EMI.

After the programming period PRO, the anode reset period AR in which the fifth transistor T5 is turned on by the first emission signal EM(n-2) and the sixth transistor T6 is turned on by the third scan signal SP(n-1) follows.

A gate electrode of the fifth transistor T5 is connected to a line through which the first emission signal EM(n-2) is provided, and a source electrode and a drain electrode thereof are connected to the node N2 and the anode of the light-emitting element EL, respectively. The fifth transistor T5 can be referred to as an emission transistor.

During the anode reset period AR, the initialization voltage VINI is applied to the node N2 through the sixth transistor T6, and the anode of the light-emitting element EL is electrically connected to the node N2 through the fifth transistor T5, and thus the anode of the light-emitting element EL is reset to the initialization voltage VINI. In this case, since the initialization voltage VINI is lower than or equal to the low potential voltage VSS, the light-emitting element EL does not emit light.

During the anode reset period AR, since the anode of the light-emitting element EL is reset to the initialization voltage VINI, the light-emitting element EL can emit light in the same situation and a screen flicker can be prevented at a low gradation.

After the anode reset period AR, the second OBS period O2 in which the fourth transistor T4 is turned on by the second emission signal EM(n) follows.

Similar to the first OBS period O1, during the second OBS period O2, the high potential voltage VDD is applied to the node N1 through the turned-on fourth transistor T4 to turn the driving transistor T1 on, thereby applying predetermined stress to the driving transistor T1. In this case, since the fifth transistor T5 is in a turned-off state, the light-emitting element EL does not emit light.

After the second OBS period O2, the initialization period INI in which the sixth transistor T6 is turned on by the third scan signal SP(n-1) follows. The initialization period INI is a short period performed between the second OBS period O2 and the light emission period EMI. The initialization period INI is a period that is shorter than other driving periods such as the first OBS period O1, the initialization and sampling period IAS, the programming period PRO, the anode reset period AR, and the second OBS period O2. When the initialization period INI is long, an effect of reducing the hysteresis phenomenon of the driving transistor through the OBS period is offset. In particular, the initialization period INI prior to the light emission period EMI is a period that is shorter than the second OBS period O2. For example, the initialization period INI can be set to about half the second OBS period O2, but the present disclosure is not limited thereto.

The initialization voltage VINI is provided to the node N2 through the sixth transistor T6 which is turned on during the initialization period INI. During the initialization period INI, the voltage of the node N2, which rises during the second OBS period O2 before the light emission period EMI, is lowered to reduce a voltage difference between the node N2 and the anode. When the fifth transistor T5 is turned on by the light emission period EMI and the node N2 and the anode are electrically connected in a state in which the voltage of the node N2 is not initialized at the initialization voltage VINI, a voltage level of the anode due to a high voltage level of the node N2 is raised. This causes difficulty in expressing a low gradation requiring a relatively weak driving current.

Therefore, the pixel drive circuit according to another embodiment of the present disclosure initializes the node N2 between the second OBS period O2 and the light emission period EMI to reduce the voltage difference between the node N2 and the node N4, thereby allowing the electroluminescent display device to accurately express a low gradation.

As briefly described above, after the initialization period INI, the fifth transistor T5 is turned on by the first emission signal EM(n-2), and the fourth transistor T4 is turned on by the second emission signal EM(n). When the fourth transistor T4 is turned on, the light emission period EMI starts. During the light emission period EMI, both the fourth transistor T4 and the fifth transistor T5 are in a turned-on state.

During the light emission period EMI, the high potential voltage VDD is provided to the source electrode of the driving transistor T1 through the fourth transistor T4, and the node N2 and the anode are electrically connected through the fifth transistor T5. Then, the driving transistor T1 is turned on by the voltage stored in the gate node to provide a driving current to the light-emitting element EL. In this case, the driving current has a value proportional to $(VDD-VDATA)^2$.

FIG. 7 is a circuit diagram illustrating a pixel drive circuit and a light-emitting element EL according to still another embodiment of the present disclosure, and FIG. 8 is a waveform diagram illustrating gate signals and voltages which are input to the pixel drive circuit of FIG. 7.

The pixel drive circuit according to still another embodiment of the present disclosure can be applied to pixels disposed in an $n^{th}$ row in a display area DA of a display panel 110. An anode of the light-emitting element EL can be connected to a node N4 (e.g., fourth node), and the pixel drive circuit can be electrically connected to the light-emitting element EL at the node N4. For example, the pixel drive circuit provides a driving current to the node N4.

Referring to FIGS. 7 and 8, in the pixel drive circuit according to still another embodiment of the present disclosure, gate signals including a first scan signal SN1(n), a second scan signal SN2(n), a third scan signal SP(n), and an emission signal EM(n) are provided through a gate drive circuit GD. In addition, a data voltage VDATA is provided through the data drive circuit 120, and power voltages including a high potential voltage VDD, a low potential voltage VSS, an initialization voltage VINI, and a reset voltage VAR are provided from the power supply. In this case, the third scan signal SP(n) is a signal for controlling a P-type transistor, and the first scan signal SN1(n) and the second scan signal SN2(n) are signals for controlling an N-type transistor.

The pixel drive circuit includes a first transistor T1, a second transistor T2, a first-third transistor T3-1, a second-third transistor T3-2, a fourth transistor T4, a fifth transistor T5, a sixth transistor T6, a seventh transistor T7, a first capacitor Cst1, and a second capacitor Cst2. In this case, the first transistor T1 is a driving transistor. An example in which all of the first transistor T1, the fourth transistor T4, the fifth transistor T5, the sixth transistor T6, and the seventh transistor T7 included in the pixel drive circuit according to still another embodiment of the present disclosure are P-type transistors, and the second transistor T2, the first-third transistor T3-1, and the second-third transistor T3-2 are N-type transistors will be described. The N-type transistor can be implemented as an oxide transistor.

The pixel drive circuit according to still another embodiment of the present disclosure can be separately operated during a first OBS period O1, an initialization and sampling period IAS, a programming period PRO, a second OBS period O2, an initialization period INI, and a light emission period EMI.

The first scan signal SN1(n) includes a pulse for turning the second transistor T2 and the second-third transistor T3-2 on during the initialization and sampling period IAS. The pulse of the first scan signal SN1(n) can overlap a pulse of the third scan signal SP(n). The pulse of the first scan signal SN1(n) is implemented as a gate high voltage.

The second scan signal SN2(n) includes a pulse for turning the first-third transistor T3-1 on during the programming period PRO. The pulse of the second scan signal SN2(n) is implemented as a gate high voltage.

The third scan signal SP(n) includes a pulse for turning the sixth transistor T6 and seventh transistor T7 on during the first OBS period O1, the second OBS period O2, the initialization and sampling period IAS, and the initialization period INI. The third scan signal SP(n) is a signal for initializing the OBS of the first transistor T1 and the nodes N2 and N4. The pulse of the third scan signal SP(n) is implemented as a gate low voltage. As described above, during the OBS period, the hysteresis of the first transistor T1 can be reduced and a frame response can be improved.

During the first OBS period O1, the initialization and sampling period IAS, the programming period PRO, the second OBS period O2 and the initialization period INI, excluding the light emission period EMI, the emission signal EM(n) includes a pulse for turning the fourth transistor T4 and fifth transistor T5 off. The pulse of the emission signal EM(n) is implemented as a gate high voltage. The pulse of the emission signal EM(n) can overlap pulses of the first scan signal SN1(n), the second scan signal SN2(n), and the third scan signal SP(n).

Hereinafter, elements constituting the pixel drive circuit, signals input to the elements, and driving of the pixel drive circuit during each driving period will be described.

The driving of the pixel drive circuit according to still another embodiment of the present disclosure is separately performed during the first OBS period O1, the initialization and sampling period IAS, the programming period PRO, the second OBS period O2, the initialization period INI, and the light emission period EMI.

The driving transistor T1 is an element which provides a driving current to the light-emitting element EL, a gate electrode of the driving transistor T1 is connected to the node N3, a source electrode thereof is connected to the node N1, and a drain electrode thereof is connected to the node N2.

When the fourth transistor T4 and the fifth transistor T5 is turned off by the emission signal EM(n), the light emission period EMI is terminated, and then the first OBS period O1 in which the sixth transistor T6 and the seventh transistor T7 are turned on by the third scan signal SP(n) follows.

A gate electrode of the sixth transistor T6 is connected to a line through which the third scan signal SP(n) is provided, a source electrode thereof is connected to a line through which the initialization voltage VINI is provided, and a drain electrode thereof is connected to the node N2. The sixth transistor T6 can be referred to as an initialization transistor.

A gate electrode of the seventh transistor T7 is connected to the line through which the third scan signal SP(n) is provided, a source electrode thereof is connected to a line through which the reset voltage VAR is provided, and a drain electrode thereof is connected to the node N4.

During the first OBS period O1, the sixth transistor T6 is turned on to apply the initialization voltage VINI to the node N2, and thus the driving transistor T1 is turned on so that predetermined stress is applied. During the first OBS period O1, in order to maintain a strong saturation state after the driving transistor T1 is turned on, a high voltage level HVINI of the initialization voltage VINI is higher than or equal to a level of the high potential voltage VDD. The initialization voltage during the OBS periods O1 and O2 can be referred to as an OBS voltage.

During the first OBS period O1, the seventh transistor T7 is turned on to apply a reset voltage VAR to the node N4, thereby resetting the anode of the light-emitting element EL. During the first OBS period O1, a voltage level LVAR of the reset voltage VAR is a level of voltage that is lower than or equal to a level of the low potential voltage VSS applied to the cathode of the light-emitting element EL and can be set to a voltage that is sufficiently lower than the operating voltage of the light-emitting element EL. The reset voltage VAR is a voltage not varying and maintains a constant voltage level LVAR when the pixel drive circuit is driven.

After the first OBS period O1, the sixth transistor T6 and the seventh transistor T7 are turned off by the third scan signal SP(n), and then the initialization and sampling period IAS in which the second transistor T2 and the second-third transistor T3-2 are turned on by the first scan signal SN1(n) follows. The sixth transistor T6 and the seventh transistor T7 are turned off between the initialization and sampling period IAS and the first OBS period O1.

The gate electrode of the second transistor T2 is connected to a line through which the first scan signal SN1(n) is provided, a source electrode thereof is connected to a line through which the initialization voltage VINI is provided, and a drain electrode thereof is connected to the node N3.

A gate electrode of the second-third transistor T3-2 is connected to the line through which the first scan signal SN1(n) is provided, and a source electrode and a drain electrode thereof are connected to the node N5 and a node N1, respectively.

The first capacitor Cst1 includes a first electrode connected to the node N3 and a second electrode connected to the node N5.

During the initialization and sampling period IAS, the second transistor T2 and the sixth transistor T6 are turned on, and the initialization voltage VINI is respectively applied to the node N3 and the node N2 through the second transistor T2 and the sixth transistor T6. For example, during the initialization and sampling period IAS, the gate electrode and the drain electrode of the driving transistor T1 are discharged to the initialization voltage VINI. In this case, the low voltage level LVINI of the initialization voltage VINI is a level that is lower than the high voltage level HVINI and is a level of a sufficiently low negative voltage capable of turning the driving transistor T1 on and initializing the gate electrode and the drain electrode of the driving transistor T1. In addition, since voltages of the gate electrode and the drain electrode of the driving transistor T1 are equal to the initialization voltage VINI, the driving transistor T1 becomes a diode connection state, and a voltage of the source node of the driving transistor T1 becomes the threshold voltage Vth of the driving transistor T1. For example, a voltage of the node N1, which is the source node of the driving transistor T1, becomes a voltage VINI-Vth.

The second-third transistor T3-2 is turned on to electrically connect the node N5 and the node N1 so that a voltage of the node N5 becomes the same as the voltage of the node N1.

In addition, during the initialization and sampling period IAS, the seventh transistor T7 is turned on to apply the reset voltage VAR to the node N4 again, thereby resetting the anode of the light-emitting element EL.

After the initialization and sampling period IAS, the programming period PRO in which the first-third transistor T3-1 is turned on by the second scan signal SN2(n) follows.

A gate electrode of the first-third transistor T3-1 is connected to a line through which the second scan signal SN2(n) is provided, a source electrode thereof is connected to a line through which the data voltage VDATA is provided, and a drain electrode thereof is connected to the node N1.

The second capacitor Cst2 includes a first electrode connected to the node N5 and a second electrode connected to a line through which the high potential voltage VDD is applied.

During the programming period PRO, the data voltage VDATA is provided to the node N5 through the first-third transistor T3-1. Since a voltage variation at the node N5 also affects the node N3 due to a coupling phenomenon of the first capacitor Cst1, a voltage of the node N3 becomes a voltage VDATA+Vth. For example, during the programming period PRO, the node N3 is charged to a voltage corresponding to the sum of the data voltage VDATA and the threshold voltage Vth of the driving transistor T1. In addition, since the high potential voltage VDD is continuously provided to the second electrode of the second capacitor Cst2, the data voltage VDATA provided to the first electrode of the second capacitor Cst2 during the programming period PRO can be maintained until the light emission period EMI.

After the programming period PRO, the second OBS period O2 in which the sixth transistor T6 and the seventh transistor T7 are turned on by the third scan signal SP(n) follows.

Similar to the first OBS period O1, during the second OBS period O2, the initialization voltage VINI is applied to the node N2 through the turned-on sixth transistor T6 to turn the driving transistor T1 on, thereby applying predetermined stress to the driving transistor T1. During the second OBS period O2, in order to maintain a strong saturation state after the driving transistor T1 is turned on, a high voltage level HVINI of the initialization voltage VINI is higher than or equal to a level of the high potential voltage VDD. For example, the initialization voltage VINI provided through the turned-on sixth transistor T6 increases a voltage of the source electrode of the driving transistor T1 to the OBS voltage. In this case, a value of Vgs becomes VDATA−|Vth|−HVINI, and during the light emission period EMI, the Vgs becomes a state of being greater than the Vgs of the driving transistor T1.

The reset voltage VAR is applied to the node N4 again through the seventh transistor T7 which is turned-on during the second OBS period O2, thereby resetting the anode of the light-emitting element EL. During the OBS period O2, the voltage level LVAR of the reset voltage VAR is a level of voltage that is lower than or equal to the level of the low potential voltage VSS applied to the cathode of the light-emitting element EL and can be set to a voltage that is sufficiently lower than the operating voltage of the light-emitting element EL.

After the second OBS period O2, the initialization period INI in which the sixth transistor T6 and the seventh transistor T7 are turned on by the third scan signal SP(n) follows. The sixth transistor T6 and the seventh transistor T7 are turned off between the second OBS period O2 and the initialization period INI. The initialization period INI is a short period performed between the second OBS period O2 and the light emission period EMI. The initialization period INI is a period that is shorter than other driving periods such as the first OBS period O1, the initialization and sampling period IAS, the programming period PRO, and the second OBS period O2. When the initialization period INI is long, an effect of reducing the hysteresis phenomenon of the driving transistor through the OBS period is offset. In particular, the initialization period INI is a period that is shorter than the second OBS period O2. For example, the initialization period INI can be set to about half the second OBS period O2, but the present disclosure is not limited thereto.

The initialization voltage VINI is provided to the node N2 through the sixth transistor T6 which is turned on during the initialization period INI. In this case, the low voltage level LVINI of the initialization voltage VINI is a level of negative voltage, which is lower than the high voltage level HVINI of the initialization voltage VINI during the first OBS period O1 or the second OBS period O2. As described with reference to FIG. 3, during the initialization period INI, the voltage of the node N2, which rises during the second OBS period O2 before the light emission period EMI, is lowered to reduce a voltage difference between the node N2 and the node N4.

Therefore, the pixel drive circuit according to still another embodiment of the present disclosure initializes the node N2 between the second OBS period O2 and the light emission period EMI to reduce the voltage difference between the node N2 and the node N4, thereby allowing the electroluminescent display device to accurately express a low gradation.

As briefly described above, the initialization period INI is followed by the light emission period EMI. During the light emission period EMI, the fourth transistor T4 and the fifth transistor T5 are turned on by the emission signal EM(n).

A gate electrode of the fourth transistor T4 is connected to a line through which the emission signal EM(n) is provided, a source electrode thereof is connected to a line through which the high potential voltage VDD is provided, and a drain electrode thereof is connected to the node N1.

A gate electrode of the fifth transistor T5 is connected to a line through which the emission signal EM(n) is provided, a source electrode thereof is connected to the node N2, and a drain electrode thereof is connected to the node N4. The fifth transistor T5 can be referred to as an emission transistor.

During the light emission period EMI, the high potential voltage VDD is provided to the source electrode of the driving transistor T1 through the fourth transistor T4, and the node N2 and the node N4 are electrically connected through the fifth transistor T5. Then, the driving transistor T1 is turned on by the voltage stored in the gate node to provide a driving current to the light-emitting element EL. In this case, the driving current has a value proportional to $(VDD-VDATA)^2$.

The electroluminescent display device and the method of driving the electroluminescent display device according to the embodiments of the present disclosure can be described as follows.

The electroluminescent display device according to one embodiment of the present disclosure includes a light-emitting element, a pixel drive circuit configured to apply a driving current to the light-emitting element, a power supply configured to provide a power voltage to the pixel drive circuit, a data drive circuit configured to provide a data voltage to the pixel drive circuit, and a gate drive circuit configured to provide a gate voltage to the pixel drive circuit. In addition, the pixel drive circuit includes a driving transistor of which a source electrode is connected to a node N1, the drain electrode is connected to a node N2, and a gate electrode is connected to a node N3, an emission transistor connected between the driving transistor and the light-emitting element, and an initialization transistor connected to the node N2. In addition, before the light-emitting element emits light, the initialization transistor is turned on to apply an initialization voltage to the node N2. Accordingly, during low speed driving and low gradation expression, it is possible to prevent image quality degradation of the electroluminescent display device.

According to another feature of the present disclosure, an initialization voltage can include a high voltage level and a negative low voltage level that is lower than the high voltage level, and a level of a voltage applied to a node N2 through an emission transistor can be a low voltage level. In addition, before the initialization voltage of the low voltage level is applied, the node N2 can be in a state of the high voltage level of the initialization voltage.

According to another feature of the present disclosure, a voltage provided to a node N2 through an initialization transistor can reduce a voltage difference between a source electrode and a drain electrode of an emission transistor.

According to another feature of the present disclosure, a pixel drive circuit can include a first initialization period, a programming period, an OBS period, a second initialization period, and a light emission period and can apply an initialization voltage to a node N2 during the second initialization period. In addition, during the OBS period, a pixel drive circuit can turn an initialization transistor on to apply a voltage that is higher than a voltage level of the initialization voltage to the node N2.

According to another feature of the present disclosure, a data voltage can be provided to a node N1 during a programming period.

According to another feature of the present disclosure, a second initialization period can be a period that is shorter than an OBS period.

According to an embodiment, the method of driving an electroluminescent display device including a light-emitting element and a pixel drive circuit includes driving the pixel drive circuit during a first initialization period, a second initialization period, an OBS period, a sampling and programming period, and a light emission period. The first initialization period is a period performed before the sampling and programming period, the second initialization period is a period performed between the OBS period and the light emission period, and the second initialization period is a period that is shorter than the first initialization period, the OBS period, the sampling and programming period, and the light emission period. Accordingly, during low speed driving and low gradation expression, it is possible to prevent image quality degradation of the electroluminescent display device.

According to another feature of the present disclosure, an initialization voltage is provided to a pixel drive circuit, the same voltage level of the initialization voltage is provided during a first initialization period and a second initialization period, and the voltage level of the initialization voltage is lower than the voltage level of the initialization voltage during an OBS period.

According to another feature of the present disclosure, a pixel drive circuit can include a driving transistor, apply an initialization voltage of a low voltage level to a drain electrode of the driving transistor during a first initialization period and a second initialization period, sample a threshold voltage of the driving transistor and apply a data voltage to a source electrode of the driving transistor during a sampling and programming period, apply an OBS voltage to a source or drain electrode of the driving transistor during the OBS period, and provide a high potential voltage to the driving transistor during a light emission period, and the driving transistor can be turned on to provide a driving current to a light-emitting element.

According to another feature of the present disclosure, an OBS voltage can be higher than or equal to a high potential voltage.

According to another feature of the present disclosure, a difference between a voltage of a drain electrode of a driving transistor and a voltage of an anode of a light-emitting element during an OBS period can be greater than a difference between the voltage of the drain electrode of the driving transistor and the anode of the light-emitting element during a second initialization period.

According to the embodiments of the present disclosure, a pixel drive circuit has an initialization period before a light emission period so that the pixel drive circuit can reduce a voltage difference between a drain electrode of a driving transistor and an anode of a light-emitting element and improve the image quality of a display panel at a low gradation.

In addition, according to the embodiments of the present disclosure, an OBS voltage is applied to the driving transistor so that it is possible to prevent the hysteresis of the driving transistor and reduce screen defects during low speed driving.

Since the contents of the specification described in the problem to be solved, the problem solving means, and the effects to be solved do not specify the essential characteristics of the appended claim, the scope of the appended claim is not limited by the details described in the content of the specification.

Although the embodiments of the present disclosure have been described in more detail with reference to the accompanying drawings, the present disclosure is not necessarily limited to these embodiments and can be variously modified without departing from the technical spirit of the present disclosure. Accordingly, the embodiments disclosed herein, therefore, are not intended to limit the technical concept of the present disclosure but for explanation thereof, and the range of the technical concept of the present disclosure is not limited to these embodiments.

Therefore, it should be understood that the above-described embodiments are not restrictive but illustrative in all aspects. The scope of the present disclosure should be construed by the appended claims, along with the full range of equivalents to which such claims are entitled.

What is claimed is:

1. An electroluminescent display comprising:
- a light emitting element; and
- a pixel driving circuit configured to apply a driving current to the light emitting element,
- wherein the pixel driving circuit includes:
  - a first transistor connected to first, second and third nodes;
  - a second transistor connected between the third node and the second node;
  - a third transistor connected between the first node and a data line;
  - a fourth transistor connected between the first node and a first driving voltage line;
  - a fifth transistor connected between the second node and a fourth node;
  - a sixth transistor connected between the first transistor and an on bias stress (OBS) voltage line;
  - a seventh transistor connected between the fourth node and a reset voltage line, and
  - a storage capacitor disposed between the first driving voltage line and the third node,
- wherein the pixel driving circuit includes a first initialization period, a programming period, an OBS period, a light emission period, and a second initialization period between the OBS period and the light emission period,
- wherein during the first initialization period and the second initialization period, the sixth transistor is turned on to apply a low voltage of the OBS voltage line, and
- wherein during the OBS period, the sixth transistor is turned on to apply a high voltage of the OBS voltage line.

2. The electroluminescent display of claim 1, wherein the second transistor is an oxide transistor.

3. The electroluminescent display claim 1, wherein when the OBS voltage line is electrically connected to the first transistor through the sixth transistor, the reset voltage line is electrically connected to the fourth node through the seventh transistor.

4. The electroluminescent display of claim 1, wherein a voltage of the OBS voltage line and a voltage of the reset voltage line are different from each other.

5. The electroluminescent display of claim 1, wherein, before the low voltage level of the OBS voltage line is applied, the second node is in a state of the high voltage level of the OBS voltage line.

6. The electroluminescent display of claim 1, wherein the low voltage provided to the second node through the sixth transistor reduces a voltage difference between a source electrode and a drain electrode of the fifth transistor.

7. The electroluminescent display of claim 1, wherein during the OBS period, the pixel driving circuit turns on the sixth transistor to apply a voltage that is higher than a voltage level of an initialization voltage to the second node.

8. The electroluminescent display of claim 1, wherein a data voltage is applied to the first node during the programming period.

9. The electroluminescent display of claim 1, wherein the second initialization period is shorter than the OBS period.

10. The electroluminescent display of claim 1, wherein a difference between a voltage of the drain electrode of the first transistor and a voltage of an anode of the light-emitting element during the OBS period is greater than a difference between the voltage of the drain electrode of the first transistor and the voltage of an anode of the light-emitting element during the second initialization period.

11. An electroluminescent display comprising,
- a light emitting element; and
- a pixel driving circuit configured to apply a driving current to the light emitting element,
- wherein the pixel driving circuit includes:
  - a first transistor connected to first, second and third nodes;
  - a second transistor connected between the third node and the second node;
  - a third transistor connected between the first node and a data line;
  - a fourth transistor connected between the first node and a first driving voltage line;
  - a fifth transistor connected between the second node and a fourth node;
  - a sixth transistor connected between the first transistor and an on bias stress (OBS) voltage line;
  - a seventh transistor connected between the fourth node and a reset voltage line; and
  - a storage capacitor disposed between the first driving voltage line and the third node,
  - wherein the pixel driving circuit includes a first initialization period, a programming period, an OBS period, a light emission period, and a second initialization period between the OBS period and the light emission period,
  - wherein during the first initialization period, the sixth transistor and the second transistor are turned on to apply a low voltage of the OBS voltage line to the second node and the third node, and
  - wherein during the second initialization period, the sixth transistor is turned on and the second transistor is turned off to apply the low voltage of the OBS voltage line to the second node.

12. The electroluminescent display of claim 11, wherein the second transistor and the third transistor are oxide transistors.

13. The electroluminescent display of claim 11, wherein the OBS voltage is applied to the first transistor when a control signal is applied, and a reset voltage is applied to the fourth node by the seventh transistor.

14. The electroluminescent display of claim 11, wherein during the OBS period, the sixth transistor is turned on to apply a high voltage of the OBS voltage line being higher than the lower voltage of the OBS voltage line.

* * * * *